United States Patent
Mroz et al.

(10) Patent No.: US 12,117,424 B2
(45) Date of Patent: Oct. 15, 2024

(54) VERSATILE TUBE-FREE JET FOR GAS CHROMATOGRAPHY DETECTOR HAVING A CONICAL INLET SKIRT

(71) Applicant: AGILENT TECHNOLOGIES, INC., Santa Clara, CA (US)

(72) Inventors: Edward D. Mroz, Wilmington, DE (US); Heng He, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 309 days.

(21) Appl. No.: 17/423,101

(22) PCT Filed: Jan. 13, 2020

(86) PCT No.: PCT/US2020/013289
§ 371 (c)(1),
(2) Date: Jul. 14, 2021

(87) PCT Pub. No.: WO2020/150126
PCT Pub. Date: Jul. 23, 2020

(65) Prior Publication Data
US 2022/0128518 A1    Apr. 28, 2022

Related U.S. Application Data

(60) Provisional application No. 62/792,337, filed on Jan. 14, 2019.

(51) Int. Cl.
| | |
|---|---|
| G01N 30/16 | (2006.01) |
| G01N 30/68 | (2006.01) |
| G01N 30/88 | (2006.01) |
| G01N 30/02 | (2006.01) |

(52) U.S. Cl.
CPC ............ *G01N 30/16* (2013.01); *G01N 30/68* (2013.01); *G01N 30/88* (2013.01); *G01N 2030/025* (2013.01)

(58) Field of Classification Search
CPC ........ G01N 30/68; G01N 30/16; G01N 30/88; B01D 53/025
USPC .......................................................... 422/89
See application file for complete search history.

(56) References Cited

U.S. PATENT DOCUMENTS

| | | | |
|---|---|---|---|
| 94,103 A | 8/1869 | Gill | |
| RE8,104 E | * 2/1878 | Little | .............. 417/175 |
| 470,711 A | 3/1892 | Siemens | |
| 534,911 A | 2/1895 | Parker | |
| 553,915 A | * 2/1896 | Karch | ................... F23D 11/102 |
| | | | 239/113 |

(Continued)

FOREIGN PATENT DOCUMENTS

| | | |
|---|---|---|
| CN | 200947095 | 9/2007 |
| CN | 203244808 U | 10/2013 |

(Continued)

OTHER PUBLICATIONS

"Non-final Office Action, U.S. Appl. No. 17/749,839", mailed Dec. 14, 2022, 18 pages.

(Continued)

*Primary Examiner* — Arlen Soderquist

(57) ABSTRACT

A jet injector for a GC that includes a body, a skirt extending away from the body; and a bore that extends through the skirt and the body to create an inlet and an outlet for the jet injector.

19 Claims, 7 Drawing Sheets

(56) References Cited

U.S. PATENT DOCUMENTS

| | | | | |
|---|---|---|---|---|
| 669,302 A * | 3/1901 | Franklin | | F23D 14/12 |
| | | | | 48/101 |
| 771,465 A | 10/1904 | Cunningham | | |
| 870,753 A * | 11/1907 | Wiederhold | | F23D 14/30 |
| | | | | 431/111 |
| 1,050,756 A * | 1/1913 | Wight | | F23D 11/10 |
| | | | | 239/431 |
| 1,136,490 A * | 4/1915 | Smith | | B05B 7/066 |
| | | | | 239/419 |
| 1,176,017 A * | 3/1916 | Armstrong | | F23D 11/10 |
| | | | | 239/432 |
| 1,204,389 A | 11/1916 | Anderson | | |
| 1,289,812 A * | 12/1918 | Kinney | | F23D 11/10 |
| | | | | 239/434.5 |
| 1,471,694 A * | 10/1923 | Jenkins | | F23D 14/54 |
| | | | | 239/430 |
| 1,696,091 A | 12/1928 | Kehl | | |
| 1,763,289 A | 6/1930 | Anderson et al. | | |
| 1,767,462 A * | 6/1930 | Lammert | | F23D 11/24 |
| | | | | 239/417.3 |
| 1,784,927 A | 12/1930 | Coon | | |
| 1,830,432 A * | 11/1931 | Hammon | | F23D 14/54 |
| | | | | 239/424.5 |
| 1,846,743 A | 2/1932 | Mandeville | | |
| 2,106,147 A | 1/1938 | Hull | | |
| 2,184,499 A * | 12/1939 | Hutchison | | F23D 14/54 |
| | | | | 239/548 |
| 2,450,790 A | 10/1948 | Greaves | | |
| 2,476,456 A | 7/1949 | Scheller | | |
| 2,517,877 A * | 8/1950 | Hinchman | | F23D 14/54 |
| | | | | 239/600 |
| 2,556,493 A * | 6/1951 | Fairfield | | F23D 11/38 |
| | | | | 239/493 |
| 2,560,941 A | 7/1951 | Fisher | | |
| 2,779,666 A | 1/1957 | Anthes | | |
| 2,817,696 A * | 12/1957 | Beck | | H10N 10/00 |
| | | | | 136/217 |
| 2,991,158 A | 7/1961 | John | | |
| 3,027,241 A | 3/1962 | Andreatch | | |
| 3,074,309 A | 1/1963 | Donald | | |
| 3,086,848 A | 4/1963 | Reinecke | | |
| 3,088,808 A * | 5/1963 | Mandell, Jr. | | G01N 21/72 |
| | | | | 436/83 |
| 3,146,823 A | 9/1964 | Loveland | | |
| 3,155,143 A | 11/1964 | Jackson et al. | | |
| 3,198,062 A * | 8/1965 | Chaffee | | G01N 21/72 |
| | | | | 356/417 |
| 3,213,747 A | 10/1965 | Der | | |
| 3,215,351 A * | 11/1965 | Briggs | | F23D 11/107 |
| | | | | 239/406 |
| 3,313,490 A | 4/1967 | Loveland | | |
| 3,321,954 A | 5/1967 | Bailey | | |
| 3,366,456 A | 1/1968 | Andreatch | | |
| 3,372,000 A | 3/1968 | Seibel et al. | | |
| 3,384,457 A * | 5/1968 | Norell | | G01N 27/626 |
| | | | | 422/54 |
| 3,385,099 A * | 5/1968 | Dietrich | | G01N 30/30 |
| | | | | 73/23.25 |
| 3,399,039 A | 8/1968 | Taft | | |
| 3,408,152 A * | 10/1968 | Cole | | F23K 5/02 |
| | | | | 431/114 |
| 3,419,359 A | 12/1968 | Anderson | | |
| 3,423,181 A | 1/1969 | Dimick et al. | | |
| 3,425,634 A * | 2/1969 | Mutchler | | F23D 11/10 |
| | | | | 239/405 |
| 3,455,657 A | 7/1969 | Jentzsch | | |
| 3,473,895 A | 10/1969 | Brittan | | |
| 3,484,825 A * | 12/1969 | Hocq | | F23Q 2/167 |
| | | | | 239/587.5 |
| 3,486,827 A * | 12/1969 | Binek | | G01N 21/72 |
| | | | | 356/417 |
| 3,489,498 A * | 1/1970 | Chaney | | G01N 27/626 |
| | | | | 436/103 |
| 3,498,027 A | 3/1970 | Buchtel, Jr. | | |
| 3,507,589 A * | 4/1970 | Keller | | F23C 99/00 |
| | | | | 431/126 |
| 3,511,224 A | 5/1970 | Porwancher | | |
| 3,531,203 A | 9/1970 | Isreeli et al. | | |
| 3,540,656 A * | 11/1970 | Yerkins | | F23D 14/54 |
| | | | | 239/424.5 |
| 3,545,936 A | 12/1970 | Jentzsch | | |
| 3,550,858 A * | 12/1970 | Larrabee | | G01N 21/72 |
| | | | | 239/338 |
| 3,574,549 A | 4/1971 | Eggertsen | | |
| 3,585,003 A * | 6/1971 | Scolnick | | G01N 30/68 |
| | | | | 436/103 |
| 3,597,162 A | 8/1971 | Reinecke | | |
| 3,615,237 A | 10/1971 | Speakman | | |
| 3,640,471 A * | 2/1972 | Winter | | G01N 21/714 |
| | | | | 239/87 |
| 3,661,533 A * | 5/1972 | David | | G01N 30/68 |
| | | | | 436/154 |
| 3,666,396 A * | 5/1972 | Briggs | | F23D 11/00 |
| | | | | 431/351 |
| 3,671,196 A | 6/1972 | Brantte | | |
| 3,677,709 A | 7/1972 | Riedmann | | |
| 3,689,225 A * | 9/1972 | White | | G01N 21/72 |
| | | | | 422/78 |
| 3,695,812 A | 10/1972 | Herron et al. | | |
| 3,767,363 A | 10/1973 | Hofmann | | |
| 3,827,859 A | 8/1974 | Vitzthum | | |
| 3,913,846 A | 10/1975 | Morris | | |
| 3,920,401 A | 11/1975 | Gatiss | | |
| 4,083,702 A | 4/1978 | Hartigan et al. | | |
| 4,119,404 A | 10/1978 | Price | | |
| 4,167,334 A | 9/1979 | Phillips | | |
| 4,182,740 A | 1/1980 | Hartmann et al. | | |
| 4,190,368 A | 2/1980 | Etess | | |
| 4,380,428 A | 4/1983 | Rozzi | | |
| 4,410,854 A | 10/1983 | Kroneisen | | |
| 4,466,943 A * | 8/1984 | Murase | | G01N 21/72 |
| | | | | 356/417 |
| 4,607,337 A | 8/1986 | Rosenbush et al. | | |
| 4,653,692 A * | 3/1987 | Bolot | | F23D 14/52 |
| | | | | 239/590.5 |
| 4,678,428 A | 7/1987 | Tanaka et al. | | |
| 4,784,833 A * | 11/1988 | Martin | | G01N 31/12 |
| | | | | 436/160 |
| 4,871,453 A | 10/1989 | Kumar | | |
| 4,886,359 A | 12/1989 | Berndt | | |
| 4,902,891 A | 2/1990 | Vestal | | |
| 4,962,662 A * | 10/1990 | Berger | | G01N 30/28 |
| | | | | 73/23.42 |
| 4,999,162 A | 3/1991 | Wells | | |
| 5,049,508 A * | 9/1991 | Hilscher | | G01N 30/06 |
| | | | | 422/89 |
| 5,073,753 A | 12/1991 | Collings et al. | | |
| 5,288,113 A | 2/1994 | Silvis et al. | | |
| 5,415,348 A | 5/1995 | Nelson | | |
| 5,494,641 A | 2/1996 | Krstanovic | | |
| 5,498,548 A | 3/1996 | White | | |
| 5,521,098 A * | 5/1996 | Hermann | | G01N 27/626 |
| | | | | 436/151 |
| 5,540,464 A | 7/1996 | Picha | | |
| 5,575,639 A * | 11/1996 | Pearl, II | | F23D 14/50 |
| | | | | 15/93.1 |
| 5,837,038 A | 11/1998 | Maas | | |
| 6,009,869 A | 1/2000 | Corbeil | | |
| 6,082,627 A | 7/2000 | Raterman | | |
| 6,158,522 A | 12/2000 | Laderoute | | |
| 6,238,622 B1 | 5/2001 | Salimian | | |
| 6,293,784 B1 | 9/2001 | Griffioen | | |
| 6,519,030 B1 | 2/2003 | Norman et al. | | |
| D917,321 S | 4/2021 | Mroz | | |
| 2002/0117855 A1 | 8/2002 | Rittenhouse | | |
| 2005/0099006 A1 | 5/2005 | White et al. | | |
| 2005/0148941 A1 | 7/2005 | Farrar | | |
| 2005/0178747 A1 | 8/2005 | Shibamoto | | |
| 2006/0213875 A1 | 9/2006 | Shibamoto | | |
| 2006/0275174 A1 | 12/2006 | Matsushita | | |
| 2006/0280572 A1 | 12/2006 | Lin | | |

(56) References Cited

U.S. PATENT DOCUMENTS

| | | |
|---|---|---|
| 2007/0224564 A1 | 9/2007 | Hong et al. |
| 2009/0314142 A1 | 12/2009 | Huang |
| 2010/0139363 A1 | 6/2010 | Klee et al. |
| 2010/0275741 A1 | 11/2010 | Lai |
| 2011/0211993 A1 | 9/2011 | Mannino |
| 2011/0318090 A1 | 12/2011 | Lai |
| 2015/0285770 A1 | 10/2015 | Mannino |
| 2015/0330956 A1 | 11/2015 | Fogwill |
| 2016/0018367 A1 | 1/2016 | Fogwill |
| 2017/0338092 A1 | 11/2017 | Stephan |
| 2017/0348721 A1 | 12/2017 | Kalsi |
| 2022/0128518 A1 | 4/2022 | Mroz |

FOREIGN PATENT DOCUMENTS

| | | | | |
|---|---|---|---|---|
| CN | 105738542 A | | 7/2016 | |
| CN | 207541027 U | * | 6/2018 | |
| DE | 2253285 A | | 5/1974 | |
| DE | 1629944 B | * | 4/1976 | ............ F23D 14/48 |
| DE | DD-242870 A | * | 2/1987 | |
| EP | 0985928 | | 3/2000 | |
| GB | 1451795 A | | 10/1976 | |
| GB | 1459793 A | * | 12/1976 | ............ F23D 11/101 |
| GB | 2037066 A | | 7/1980 | |
| GB | 2064763 A | * | 6/1981 | ............ G01N 21/72 |
| GB | 2081004 A | | 2/1982 | |
| JP | 51-54491 A | | 5/1976 | |
| JP | 52-6596 A | | 1/1977 | |
| JP | S54130087 A | | 10/1979 | |
| JP | H02183160 A | | 7/1990 | |
| JP | 4-157361 A | | 5/1992 | |
| JP | H0915223 A | | 1/1997 | |
| JP | H09203724 A | | 8/1997 | |
| JP | 9-257750 A | | 10/1997 | |
| JP | 10-111246 A | | 4/1998 | |
| JP | 10206386 A | | 8/1998 | |
| JP | H10206386 A | | 8/1998 | |
| JP | 2000206091 A | | 7/2000 | |
| JP | 2000227416 A | | 8/2000 | |
| JP | 2005-201687 A | | 7/2005 | |
| JP | 2006194778 A | * | 7/2006 | |
| JP | 2006194781 A | * | 7/2006 | |
| JP | 3135016 U | | 8/2007 | |
| JP | 3138552 U | | 1/2008 | |
| RU | 1791769 A1 | | 1/1993 | |
| SU | 445899 A | | 6/1975 | |
| SU | 512424 A1 | | 4/1976 | |
| SU | 586383 A1 | | 12/1977 | |
| SU | 595670 A1 | | 2/1978 | |
| SU | 693223 A1 | | 10/1979 | |
| SU | 1295337 A1 | | 3/1987 | |
| SU | 1354098 A1 | | 11/1987 | |
| SU | 1608576 A1 | | 11/1990 | |
| WO | 2010069212 A1 | | 6/2010 | |

OTHER PUBLICATIONS

Agilent Technologies, FID JET 0.11 inch ID, Document No. G4591-20320, Mar. 7, 2014, 1 page.

Agilent Technologies, Jet Family Weldment, Document No. G1531-90510, Jul. 13, 1995, 1 page.

Hewlett-Packard Company, Supplier for HP Gas Chromatographs, Publication No. 43-5954-9178, 1988, 2 pages.

D. R. Hansen et al., "Comparision of Metal-Sensitive Flame Ionization and Carbon-Sensitive Flame Ionization Detectors for the Gas Chromatographic Determination of Organotins", Anal. Chem. 1981, 53, pp. 857-861.

J. F. Chapman et al. "An Improved Plasma Jet System for Spectrochemical Analysis", Analyst, Jul. 1973, vol. 98, pp. 529-534.

M. A. Osman et al., "Response Enhancement by Metal Doping of a Silicon-Selective Flame Ionization Detector for Gas Chromatography", Journal of Chromatography, 213 (1981), pp. 397-412.

International Search Report and Written Opinion dated Apr. 5, 2020, PCT Patent Application No. PCT/US2020/013289, filed Jan. 13, 2020, 6 pages.

The USPTO, "Non-Final Office Action, U.S. Appl. No. 17/749,839", mailed Apr. 19, 2023, 15 pages.

Moye, H. A., Analytical Chemistry 1969, 41, pp. 1717-1719.

Agilent 7890 Series Gas Chromatograph Manual 2014, 354 pages.

Classes of Stainless Steel blog, 2015, 9 pages, downloaded from https://www.metalsupermarkets.com/classes-of-stainless-steel/.

"U.S. Appl. No. 17/749,839, Non Final Office Action mailed Aug. 12, 2022", 24 pages.

"The extended European search report, EP Application No. 20741420.2-1001", mailed Sep. 15, 2022, 9 pages.

Stafford A E et al: "Fused—silica capillary gas chromatography of permethylated cytokinins with flame-ionization and nitrogen—phosphorus detection", Journal of Chromatography A, Elsevier, Amsterdam, NL, vol. 247, No. 1, Sep. 24, 1982 (Sep. 24, 1982), pp. 176-179, XP026549681, ISSN: 0021-9673, DOI: 10.1016/S0021-9673(00)84869-4 [retrieved on Sep. 24, 1982].

Agilent, "Agilent Intuvo 9000 GC Columns and Supplies", Aug. 29, 2016, 24 pages.

English translation of Office Action and Search Report for China Application No. 202080008562.4, dated Sep. 28, 2023, 25 pages.

Boys, F.L., "Temperature-Programed Capillary Columns" in Developments in Applied Spectroscopy, Ferraro, J.R. et al. (eds) ,Springer, Boston, MA, 1963, vol. 2, pp. 415-425. (Year: 1963).

Final Office Action for U.S. Appl. No. 17/749,839, dated Aug. 21, 2023, 20 pages.

Notice of Allowance for U.S. Appl. No. 17/749,839, mailed Jan. 3, 2024, 11 pages.

Non-Final Office Action for U.S. Appl. No. 17/749,839, mailed Mar. 20, 2024, 23 pages.

* cited by examiner

VERSATILE TUBE-FREE JET FOR GAS CHROMATOGRAPHY DETECTOR HAVING A CONICAL INLET SKIRT

RELATED APPLICATIONS

The present application is a national stage filing under 35 U.S.C 371 of PCT application number PCT/US2020/013289, having an international filing date of Jan. 13, 2020, which claims the benefit of U.S. Provisional Application No. 62/792,337, filed on Jan. 14, 2019, contents of which are expressly incorporated herein by reference thereto,

FIELD OF THE INVENTION

The present disclosure relates to an improved jet injector for gas chromatography (GC) and particularly a jet injector used in a flame ionization type detector (FID) and a nitrogen phosphorous (NPD) detector.

BACKGROUND

The current jet injectors include multiple parts that must be connected to one another by soldering or brazing process, which may create weak areas or create high offset signals on the GC detector. Additionally, it is very difficult to insert a column into the inlet of the current jet injectors. Furthermore, the current jet injectors are coated with a lubricant to minimize galling risk. This coating contaminates the gas being analyzed and causes the instrument to provide erroneous results. The current jet injectors also include a very small inlet for the user to insert a column. Thus, often the edges of the column are damaged while a user is trying to insert it into the jet injector. Accordingly, there is a need for a simple jet injector that eliminates the shortcomings of the current jet injectors.

SUMMARY OF THE INVENTION

In an aspect, a jet injector for a GC includes a body, a skirt extending away from the body, and a bore that extends through the skirt and the body to create an inlet and an outlet for the jet injector.

In another aspect, the bore includes a first diameter at the inlet and a second diameter proximal to the outlet that is different from the first diameter.

In a further aspect, the bore includes a variable diameter though out the jet injector.

In yet another aspect, a portion of the bore corresponding to the skirt includes a variable diameter and a portion of the bore corresponding to the body includes a constant diameter.

In an aspect, the bore includes a diameter at the inlet of from about 1 mm to about 10 mm and the bore includes a diameter proximal to the outlet of from about 0.1 mm to about 3 mm.

in another aspect, the skirt includes an angle of from about 1 degree to less than 90 degrees with respect to a centerline.

In a further aspect, the skirt includes an angle of about 10 degrees.

In yet another aspect, the jet injector includes a total length of from about 20 mm to about 50 mm.

In an aspect, the skirt includes a length of from about 1 mm to about 50 mm.

In another aspect, the body includes one of an extension or protrusion.

In a further aspect, the extension or protrusion is from about 1 mm or less to about 30 mm or more.

In yet another aspect, the body and the skirt form a single unitary piece.

In an aspect, the body and the skirt are made of high-performance alloy.

In another aspect, wherein the high-performance alloy is an alloy that is resistant to galling.

in a further aspect, the high-performance alloy includes one or more of chromium, manganese, nickel, copper, titanium, molybdenum, silicon, columbium, tantalum, carbon, phosphorus, sulfur, nitrogen, and iron.

In yet another aspect, the body includes an indicator that corresponds to a predetermined size of an orifice at the outlet.

In an aspect, a jet injector for a GC including a body having an orifice, wherein the orifice includes a predetermined size, and an indicator corresponding to the predetermined size of the orifice.

In another aspect, the indicator is in a form of a number of rings around the body.

In a further aspect, the number of rings around the body determines the predetermined size of the orifice.

In yet another aspect, the indicator is in a form of a color, marking, or a number.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DRAWINGS

Figure 2A:
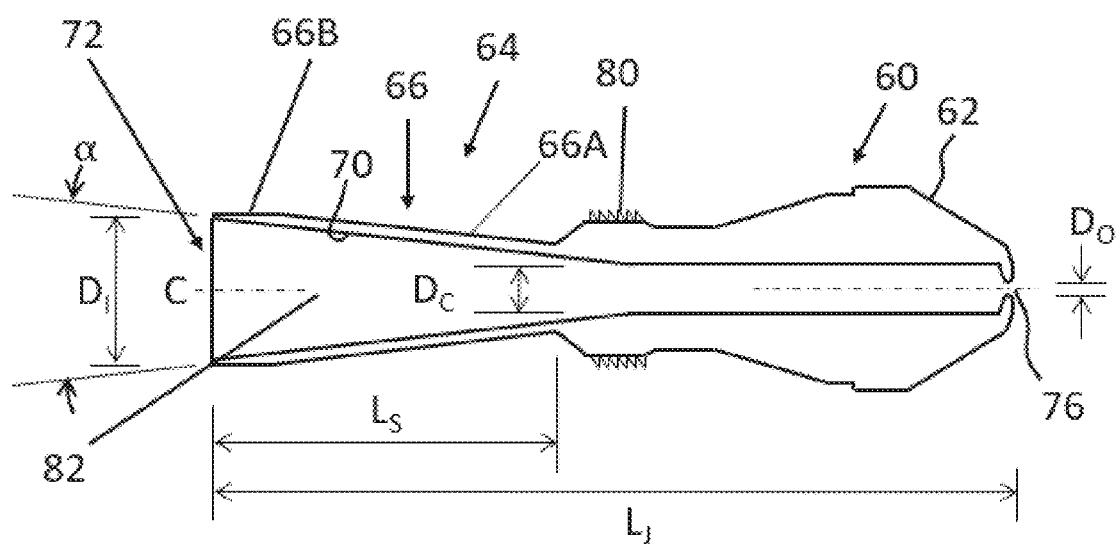
FIG. 2A is a cross-sectional view of a jet injector, according to some examples.
Figure 2B:
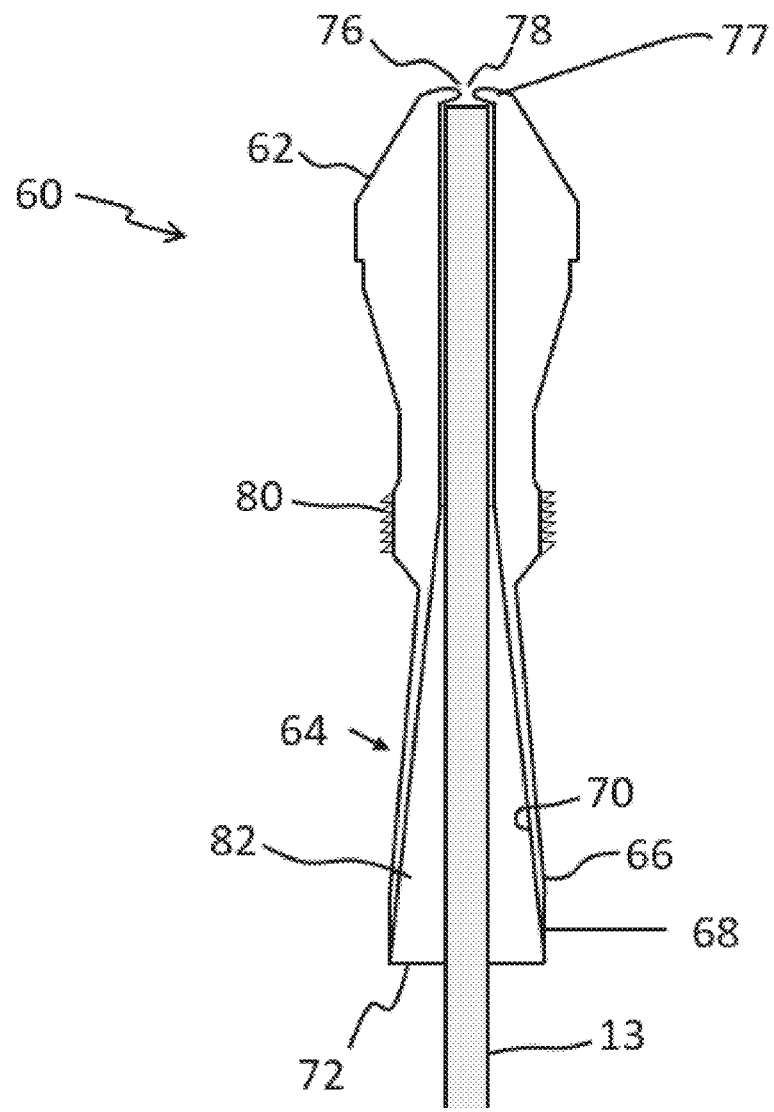
Figure 2C:
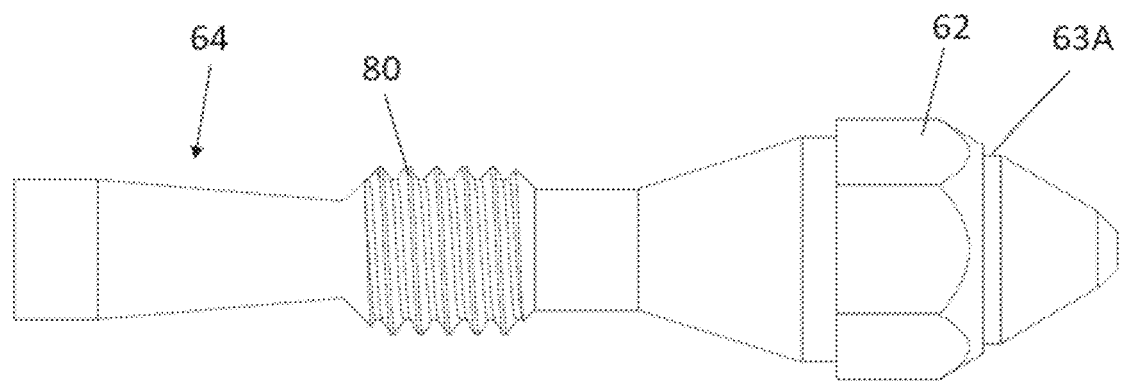
Figure 2D:
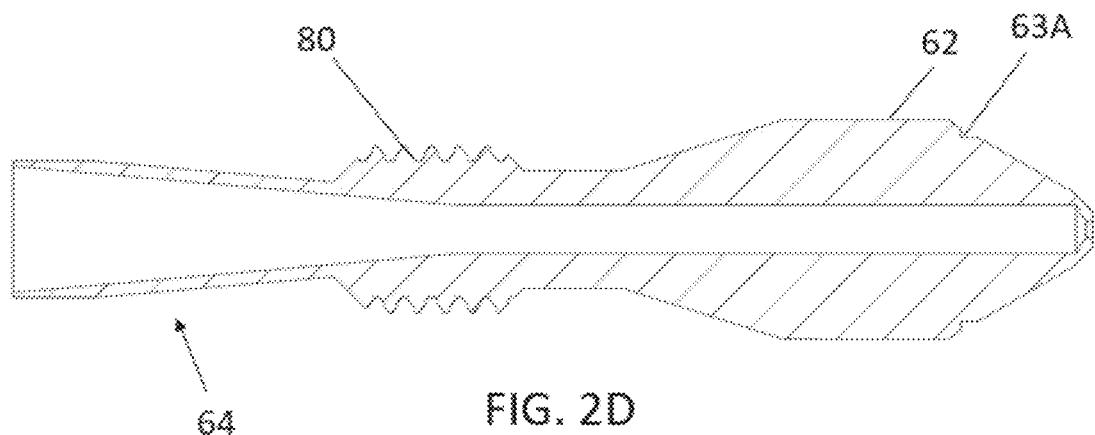
Figure 2E:
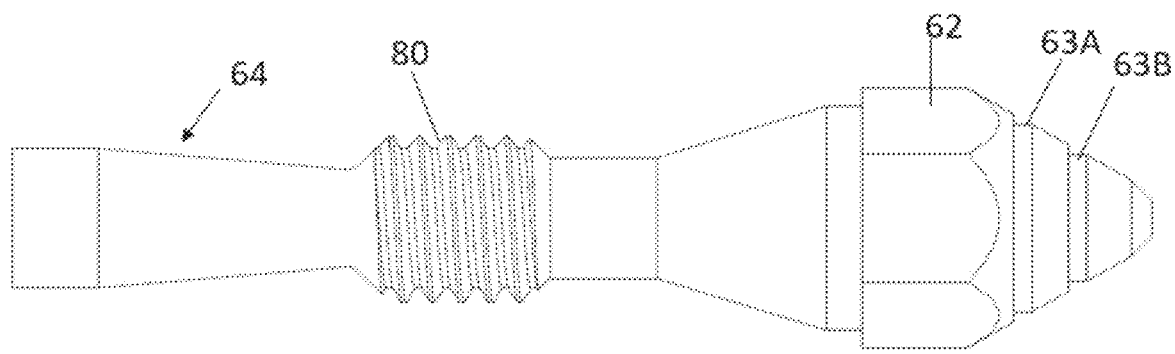
Figure 2F:
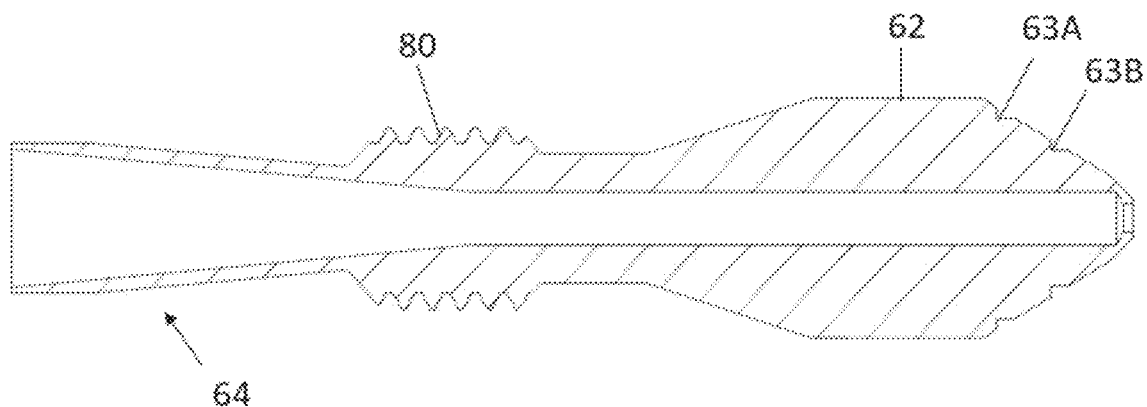
Figure 2G:
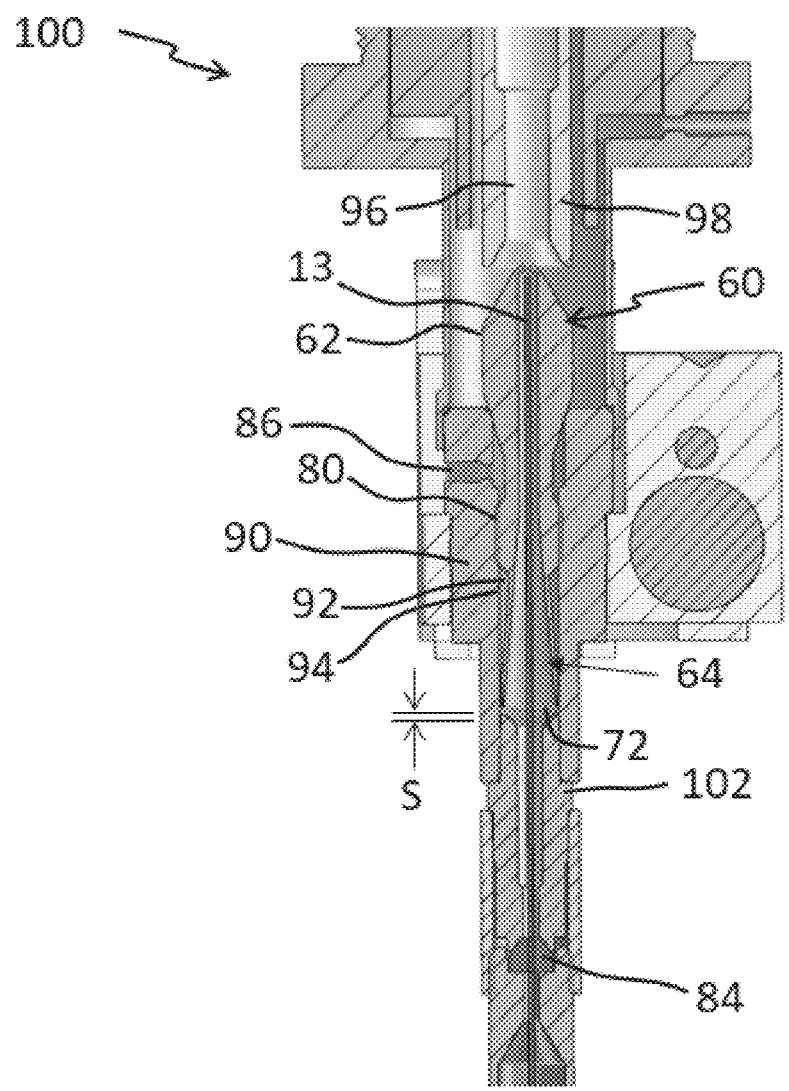
Figure 3:
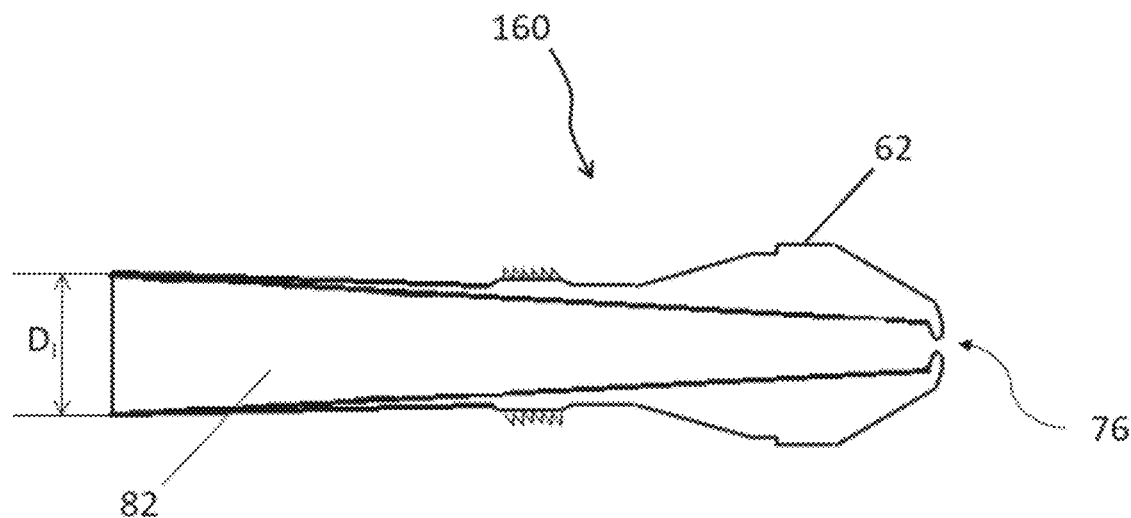
Figure 4A:
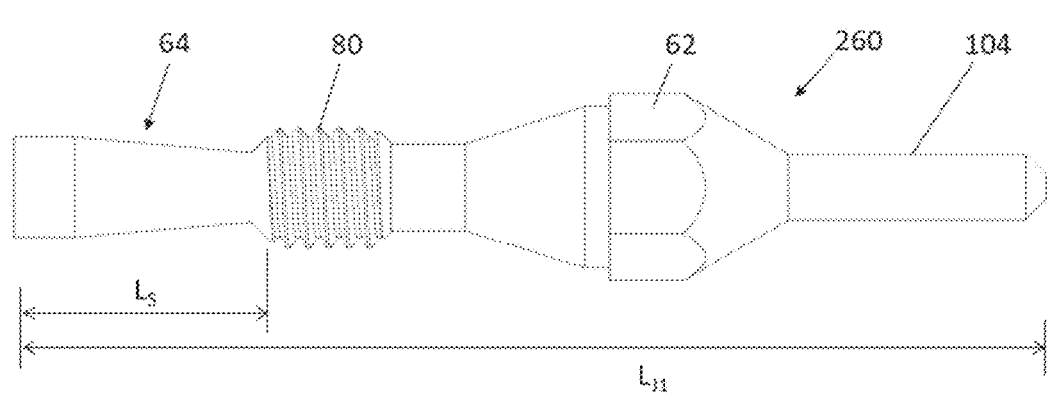
Figure 4B:
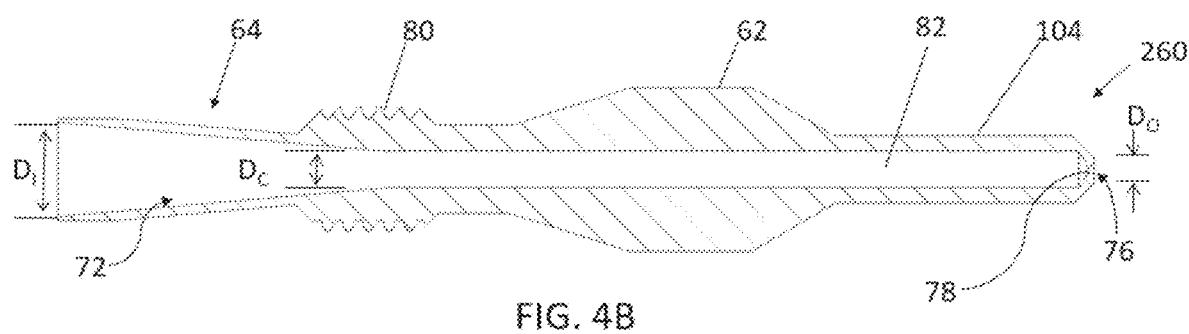
Figure 4C:
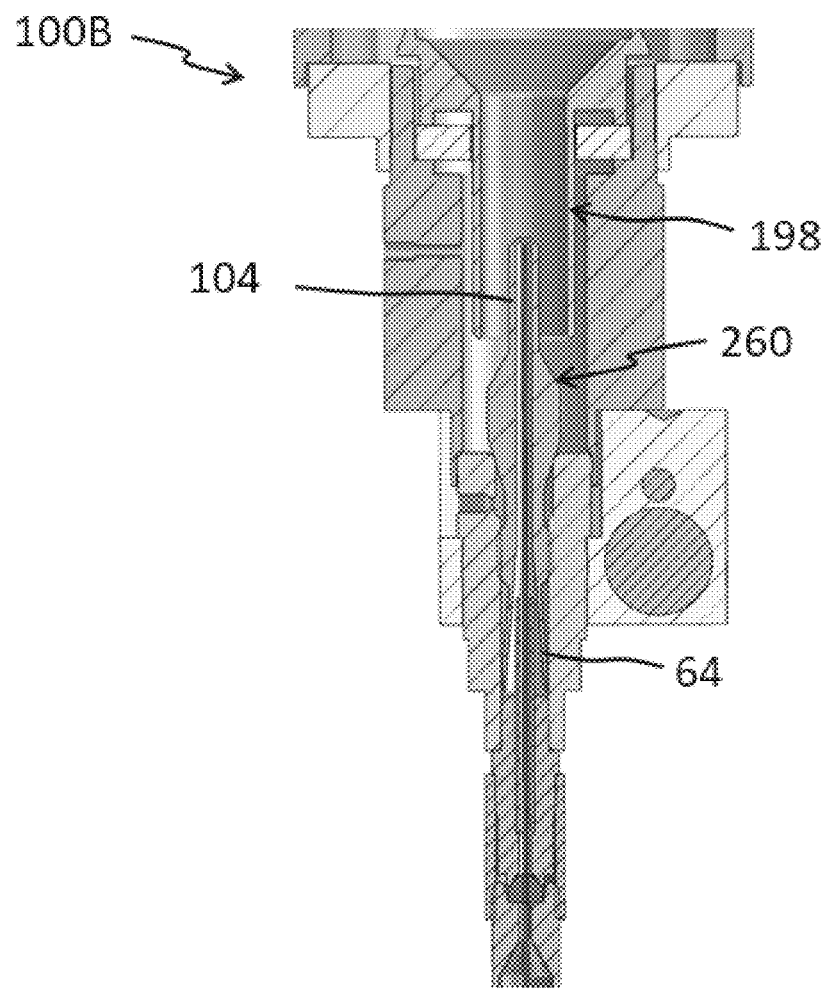

FIG. 2B the jet injector of FIG. 2A with a separation column inserted therein, according to some examples;

FIGS. 2C and 2E are top views of two jet injectors with an orifice size indicator, according to some examples;

FIGS. 2D and 2F are cross-sectional views of the jet injector of FIGS. 2C and 2E, respectively; according to some examples;

FIG. 2G is a cross-sectional view of a detector weldment including the jet injector of FIG. 2A, according to some examples;

FIG. 3 is a cross-sectional view of yet another jet injector, according to some examples;

FIG. 4A is a top view of another jet injector, according to some examples;

FIG. 4B is a cross-sectional view of the injector of FIG. 4A, according to some examples; and FIG. 4C is a cross-sectional view of a detector weldment including the jet injector of FIG. 4A, according to some examples.

The same part numbers designate the same or similar parts throughout the figures.

DESCRIPTION

Figure 1:
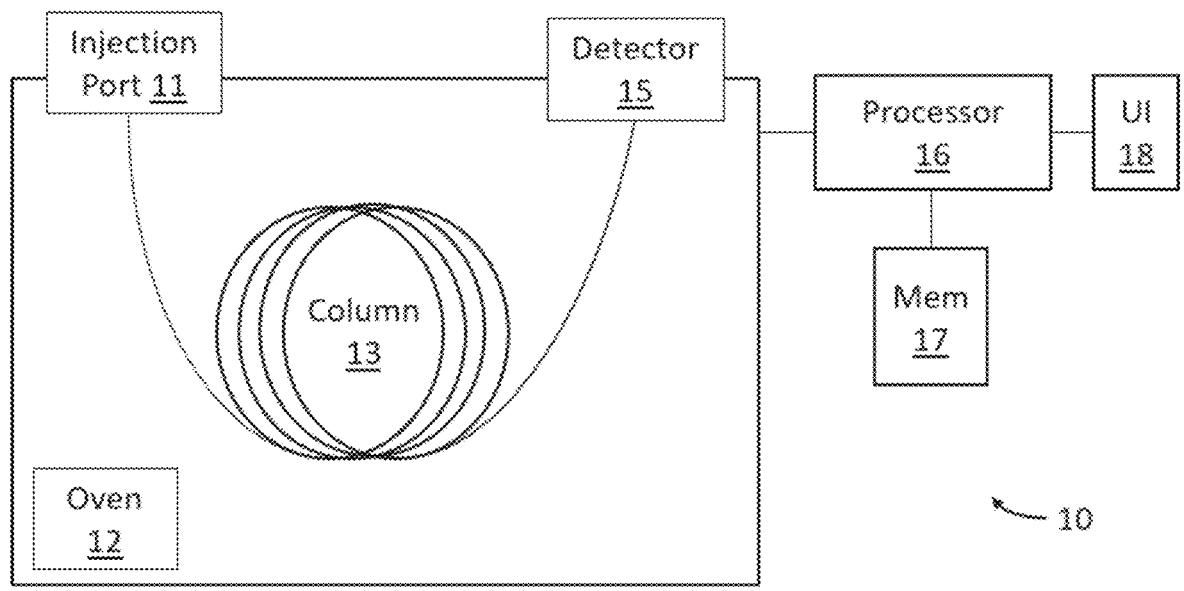
FIG. 1 is a schematic diagram of a conventional gas chromatography system, according to some examples.

FIG. 1 is a schematic diagram of a GC system 10. The GC system 10 may include a temperature-controlled injection port 11, an oven 12, a separation column 13, a detector 15, a processor 16, a memory 17, and a user interface 18. In use, a user may inject a sample fluid (e.g., gas) into the injection port 11, The injected sample fluid may then be carried by a carrier gas through the separation column 13 before reaching the detector 15. Oven 12 is designed to control the temperature of the separation column 13 to a desired temperature. When the sample reaches the detector 15, the detector 15 sends a current through the gas and detects a voltage corresponding to at least one component of the sample. The generated voltage is then provided to the processor 16 for analysis. The result of the analysis may be stored and accessed through memory 17 by a user interface 18.

In an example, the separation column 13 is connected to the detector via a jet injector 60, shown in FIG. 2A. Referring to FIGS. 2A and 2B, the jet injector 60 may be made of a single unitary piece of material. For example, the jet injector 60 may be machined, 3D printed, or may be cast molded into the jet injector 60. In an example, the material that may be used to manufacture or machine the jet injector 60 may be any metal, alloy, or polymer that is resistant to galling and may withstand high temperatures, such as a temperature of from about 200° C. to about 1000° C., such as a temperature of from about 300° C. to about 700° C., for example, a temperature of about 500° C. In an example, the material may be a high-performance alloy. In an example, a high-performance alloy may include elements such as chromium, manganese, nickel, copper, titanium, molybdenum, silicon, columbium, tantalum, carbon, phosphorus, sulfur, nitrogen, iron, or a combination thereof. For example, the high-performance alloy may be NITRONIC which can be purchased from HP Alloys in Tipton, Ind. Some examples of NITRONIC alloy includes NITRONIC 60 (UNS S21800) NITRONIC 50 (UNS S20910), UNS S45500, UNS S46500, UNS S42010, and UNS S42000, The use of such alloys eliminates the need to coat the jet injector 60 with a lubricant. Moreover, given the jet injector 60 is made of a single unitary piece of alloy, the jet injector 60 will not include any weak points, such as areas where different parts are welded together.

In one example, the jet injector 60 may be used in a flame ionization detector (FID). The jet injector 60 may include two main parts, a body 62 and a skirt 64. The skirt 64 may be in any shape. For example, it may be conical, polygonal, or in any other shape.

In another example, the body 62 and the skirt 64 may be formed separately and then may be connected to one another, for example, by welding, screws, press-fitting, etc.

In an example, a thread 80 may be positioned between the body 62 and the skirt 64. In another example, the thread 80 may be positioned around the body 62, for example, at an end area of the body 62. The thread 80 may removably connect the jet injector 60 to the detector weldment 100 (see FIG. 2G).

In an example, a bore 82 may extend from the inlet of the skirt 64 up to the outlet 76 of the jet injector 60. The bore 82 may have a constant diameter that corresponds to the body 62 of the jet injector 60 and a variable diameter corresponding to the skirt 64 of the jet injector 60. In an example, the variable diameter corresponding to the skirt 64 may be increasing as the skirt 64 extends away from the body 62. Such a design allows a user to more conveniently insert an end of the separation column 13 into the jet injector 60.

In an example, as shown in FIG. 2A, the skirt 64 includes an outer wall 66 and an inner wall 70. As shown in FIG. 2A, the inner wall 70 is in a shape of a cone (has a constant slope), thus, the inner wall substantially maintains the same angle with respect to the centerline C. In contrast, the outer wall 66 includes a first portion 66A and a second portion 669. The first portion 66A may substantially include a constant slope, thus, it also substantially maintains the same angle with respect to the centerline C. However, the second portion 669 includes a different slope than the first portion 66A. Thus, it forms a second angle with respect to the centerline C. In one example, the angle formed between the second portion 66B and the centerline C is smaller than the angle formed between the first portion 66A and the centerline C.

This design reduces the thickness of the skirt 64 at its outer edge so that a user can more easily insert an end of the separation column 13 into the jet injector 60. In an example, the length of the first portion 66A is larger than the second portion 66B. For example, the first portion 66A may include a length of from about 1 mm to about 49 mm, such as a length of from about 5 mm to about 10 mm, for example, a length of about 9.2 mm. The second portion 66B may include a length of less than about 24 mm, such as a length of from about 1 mm to about 5 mm, for example a length of about 2.34 mm.

In an example, the inner wall 70 of the skirt 64 may include an angle $\alpha$ of from about 0.1 degrees to about less than 90 degrees with respect to the centerline C. For example, the angle $\alpha$ may be from about 1 degree to about 60 degrees, such as from about 5 degrees to about 45 degrees, for example, about 10 degrees. The angle $\alpha$ then smoothly transitions to the constant diameter portion of the bore 82 corresponding to the body 62.

In an example, an inlet 72 of the jet injector 60 may include a diameter $D_I$ that is from about 1 mm to about 10 mm, such as about 1.4 mm to about 5 mm, for example from about 2.5 mm to about 4 mm. In one example, the diameter $D_I$ is about 3.75 mm. Additionally, the constant diameter $D_C$ of the portion of the bore 82 corresponding to the body 62 and/or proximal to the outlet 76 may be from about 0.1 mm to about 3 mm, such as from about 0.5 mm to about 2 mm, for example, a diameter $D_C$ of from about 1 mm to about 1.4 mm. Furthermore, the outlet 76 may include an orifice 78 which may include a diameter $D_O$ of from about 0.01 mm to about 0.5 mm, such as a diameter of from about 0.2 mm to about 0.4 mm, for example, a diameter of about 0.29 mm.

In one example, the total length $L_J$ of the jet injector 60 may be from about 20 mm to about 50 mm, such as from about 25 mm to about 45 mm, for example, from about 31.25 mm to about 40.39 mm or about 31.25 mm. In an example, the skirt 64 of the jet injector 60 may include a length $L_S$ of from about 1 mm to about 50 mm, such as from about 5 mm to about 45 mm or from about 10 mm to about 40.39 mm, for example, from about 9 mm to about 30 mm or about 9.2 mm.

In an example, as shown in FIG. 2B, the separation column 13 may be inserted into the inlet 72. As the user pushes the separation column 13 forward, the skirt 64 may guide the separation tube towards the outlet 76. A stop 77 may prevent the separation column 13 to exit the opening 76. The size of the orifice 78 may be determined by the width of the stop 77. For example, as stated above, the orifice diameter DO may be from about 0.01 mm to about 0.5 mm. Further, as shown in FIG. 2B, a wall that forms the skirt 64 tapers from a larger thickness generally adjacent a transition from a constant diameter to a variable diameter portion of the bore to a smaller thickness generally adjacent the inlet 72 of the jet injector 60.

In an example, the body 62 may include an indicator. For example, the indicator may be in a form of a number of rings. As shown in FIG. 2A, the head portion of the body 62 does not include a ring, which indicates that the orifice 78 includes a first predetermined size. In another example, as shown in FIGS. 2C and 2D, the head portion of the body 62 may include a ring 63A. The ring 63A indicates that the orifice 78 includes a second predetermined size. In yet another example, as shown in FIGS. 2E and 2F, the head portion of the body 62 may include rings 63A and 63B. Rings 63A and 63B indicate that the orifice 78 includes a third predetermined size. Additional orifice 78 sizes may be indicated by additional rings on the head portion of the body 62. In an example, each ring may have a width of from about 0.1 mm to about 1 mm, such as a width of about 0.5 mm. In another example, the size of the orifice may be indicated by a specific color, number, or marking.

Referring to FIG. 2G, the jet injector 60 may be inserted into the detector weldment 100 and is removably secured to the detector weldment 100 such that the orifice 78 is facing the detection zone 96 of a collector 98. In an example, the jet injector 60 may be removably secured to the detector weldment 100, via the threads 80 that correspond to a set of threads on the inner surface of the jet seat fitting 90. In another example, the jet injector 60 may be removably secured to the detector weldment 100 via friction fitting or other ways known to one skilled in the art. One end of the separation column 13 may be then inserted into the jet injector 60. The skirt 64 enables the user to more easily insert and feed the separation column 13 into the jet injector 60 until the separation column 13 reaches the stop 77. The user may then pull back the separation column 13 by 1 or 2 mm and secure it to the detector weldment 100. In an example, the separation column 13 may be secured to the detector weldment 100 by aligner fitting 102 and ferrule fitting 84. In some examples, by securing the separation column 13 to the detector weldment 100, the separation column may move by 1 or 2 mm towards the stop 77.

In an example, the jet injector 60 is positioned in the detector weldment 100 such that the skirt 64 faces the surface wall 94 of the channel 92 without actually sealing the channel 92. Additionally, a portion of the body 62 may sit on the jet seat fitting 90, such that it seals the end of the jet seat fitting 90.

In operation, the separation column 13 carries the injected sample fluid into the jet injector 60. A makeup gas, which may include at least one or more of $H_2$, $N_2$, and/or He, may be introduced into the detector weldment 100 via port 86 that is part of the jet seat fitting 90. Given that the end of the jet seat fitting 90 is sealed by the body 62, the makeup gas may travel in the channel 92 between the surface wall 94 and the skirt 64. The makeup gas may then flow into the inlet 72 around the separation tube and flow along the exterior of the separation column 13 towards the orifice 78 where the fluid from the separation column 13 and the makeup gas merge together and exit the jet injector 60 through outlet 76 and into the detection zone 96 defined by the collector 98. As described above, when the sample reaches the detection zone 96, the detector 15 sends a current through the gas and detects a voltage corresponding to at least one component of the sample, FIG. 3 illustrates another example of a jet injector 160. In this example, the portion of the bore 82 may not include a constant diameter. Instead, in the jet injector 160, the bore diameter increases as the body 62 extends away from the outlet 76. In an example, the largest diameter of the bore 82 may be from about 1 mm to about 10 mm, such as about 1.4 mm to about 5 mm, for example from about 2.5 mm to about 4 mm. In one example, the diameter $D_I$ is about 3.75 mm. Additionally, the smallest diameter of the bore 82, which is proximal to the outlet end 76 may be from about 0.1 mm to about 3 mm, such as from about 0.5 mm to about 2 mm, for example, a diameter of from about 1 mm to about 1.4 mm.

Referring to FIGS. 4A and 4B, in an example, a jet injector 260 may include extension or protrusion 104. Such a jet injector 260 may be used in detectors, such as nitrogen phosphorous (NPD) detectors. The extension or protrusion 104 may be from about 1 mm or less to about 30 mm or more, such as from about 5 mm to about 20 mm, for example, it may be about 10 mm in length. In this example, the bore 82 constant diameter corresponding to the body 62 extends through the extension or protrusion 104.

Referring to FIGS. 4A and 4B, the total length $L_{J1}$ of the jet injector 260 may be from about 20 mm to about 50 mm, such as from about 30 mm to about 45 mm, for example, from about 35 mm to about 42 mm or about 40.39 mm. In an example, the skirt 64 of the jet injector 260 may include a length $L_S$ of from about 1 mm to about 50 mm, such as from about 5 mm to about 45 mm or from about 10 mm to about 40.39 mm, for example, from about 9 mm to about 30 mm or about 9.2 mm.

In an example, the inlet 72 of the jet injector 260 may include a diameter $D_I$ that is from 1 mm to about 10 mm, such as about 1.4 mm to about 5 mm, for example from about 2.5 mm to about 4 mm. In one example, the diameter $D_I$ is about 3.75 mm. Additionally, the constant diameter of the portion of the bore 82 corresponding to the body 62 may be from about 0.1 mm to about 3 mm, such as from about 0.5 mm to about 2 mm, for example, a diameter of from about 1 mm to about 1.4 mm. Furthermore, the outlet 76 may include an orifice 78, which may include a diameter $D_O$ of from about 0.01 mm to about 0.5 mm, such as a diameter of from about 0.2 mm to about 0.4 mm, for example, a diameter of about 0.29 mm.

Referring to FIG. 4C, the jet injector 260 may be inserted into the detector weldment 100B and be removably secured to the detector weldment 100B in a substantially similar manner, as the jet injector 60, described with respect to in FIG. 2G. However, in this example, the extension or protrusion 104 of the jet injector 260, at least partially, extends into the collector 198.

The operation of the jet injector 260 is substantially similar to the operation of the jet injector 60 described with respect to FIG. 2G.

This disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompasses in its disclosure and teaches equivalents, means, systems and methods for practicing the many aspects, mechanisms and devices disclosed herein. Additionally, this disclosure is intended to encompass the equivalents, means, systems, and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A jet injector for gas chromatography (GC) comprising:
   a body section including a single outlet of the jet injector and positioned at one end of the jet injector;

a skirt section including a conical outer profile that is tapered outwardly towards a single inlet of the jet injector and positioned at an opposite end from the body section; and a threaded section positioned between the body section and the skirt section, wherein a bore extends through the skirt section, the threaded section, and the body section to create the inlet and the outlet for the jet injector, and wherein a wall that forms the skirt section tapers from a larger thickness generally adjacent the threaded section to a smaller thickness generally adjacent the inlet of the jet injector.

2. The jet injector of claim 1, wherein the bore includes a first diameter at the inlet and a second diameter proximal to the outlet that is different from the first diameter.

3. The jet injector of claim 1, wherein a portion of the bore corresponding to the skirt section substantially includes a variable diameter and a portion of the bore corresponding to the body section substantially includes a constant diameter.

4. The jet injector of claim 1, wherein a portion of the bore corresponding to the skirt section includes a variable diameter, a portion of the bore corresponding to the threaded section includes both a variable diameter and a constant diameter, and a portion of the bore corresponding to the body section includes a constant diameter.

5. The jet injector of claim 4, wherein the body section includes the outlet having an orifice that includes a diameter that is different from the diameter of the bore corresponding to the skirt section, the threaded section and the body section.

6. The jet injector of claim 4, wherein the variable diameter of the bore is at an angle of about 10 degrees.

7. The jet injector of claim 1, wherein the jet injector includes a total length of from about 20 mm to about 50 mm.

8. The jet injector of claim 1, wherein the skirt section includes a length of from about 1 mm to about 50 mm.

9. The jet injector of claim 1, wherein the body section includes one of an extension or protrusion that includes the bore.

10. The jet injector of claim 9, wherein the extension or protrusion is from about 1 mm or less to about 30 mm or more.

11. The jet injector of claim 1, wherein the body section, the threaded section, and the skirt section form a single unitary piece.

12. The jet injector of claim 1, wherein the body section, the threaded section, and the skirt section are made of high-performance alloy, and wherein the high-performance alloy is an alloy that is resistant to galling.

13. The jet injector of claim 1, wherein the body section, the threaded section, and the skirt section are made of high-performance alloy, and wherein the high-performance alloy includes one or more of chromium, manganese, nickel, copper, titanium, molybdenum, silicon, columbium, tantalum, carbon, phosphorus, sulfur, nitrogen, and iron.

14. The jet injector of claim 1, wherein the body section includes an indicator that corresponds to a predetermined size of an orifice at the outlet.

15. The jet injector of claim 1, wherein the skirt section includes a length of from about 5 mm to about 45 mm.

16. A jet injector for gas chromatography (GC) comprising:

an exterior threaded section;

a body including a single outlet of the jet injector and positioned at one end of the jet injector;

a skirt including a conical outer profile that is tapered outwardly towards a single inlet of the jet injector and positioned at an opposite end from the body; and an indicator incorporated into the body and corresponding to a characteristic of the jet injector, wherein a bore extends through the skirt, the threaded section, and the body to create the inlet and the outlet for the jet injector, and wherein a wall that forms the skirt tapers from a larger thickness generally adjacent the threaded section to a smaller thickness generally adjacent the inlet of the jet injector.

17. The jet injector of claim 16, wherein the indicator is in a form of a number of rings around the body.

18. The jet injector of claim 17, wherein the number of rings around the body determines a predetermined size of an orifice in the body.

19. The jet injector of claim 16, wherein the indicator is in a form of a color, a marking, or a number.

* * * * *